March 31. 1925.

C. V. PERRY

GROUND CLAMP

Filed March 15, 1924

1,531,411

Inventor
Charles V. Perry
By Horatio E. Bellows
Attorney

Patented Mar. 31, 1925.

1,531,411

UNITED STATES PATENT OFFICE.

CHARLES V. PERRY, OF WEST HAVEN, CONNECTICUT.

GROUND CLAMP.

Application filed March 15, 1924. Serial No. 699,546.

*To all whom it may concern:*

Be it known that I, CHARLES V. PERRY, a citizen of the United States, residing at West Haven, in the county of New Haven and State of Connecticut, have invented certain new and useful Improvements in Ground Clamps, of which the following is a specification.

My invention relates to grounding devices for electric currents of the type adapted for clamping a pipe.

The essential objects of my invention are the prevention of arcing; special adaptability for use upon vertically disposed pipes; convenience and security of attachment of the conductor to the device together with facilitating the soldering operation; and the attainment of these objects in a simple, strong, and inexpensive structure.

To the above ends essentially my invention consists in such parts and in such combinations of parts as fall within the scope of the appended claims.

In the accompanying drawings which form a part of this specification

Figure 1:
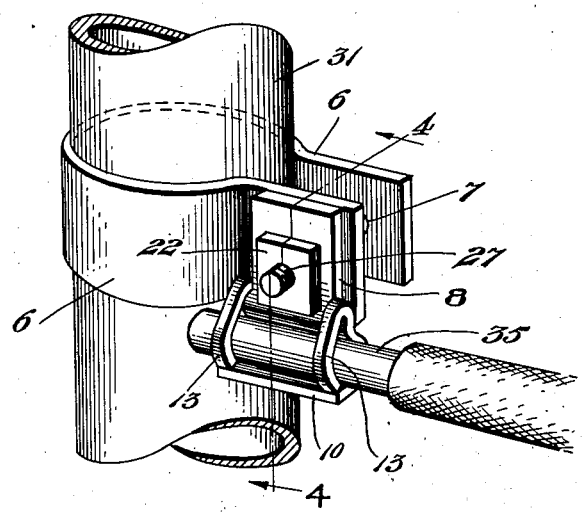
Figure 2:
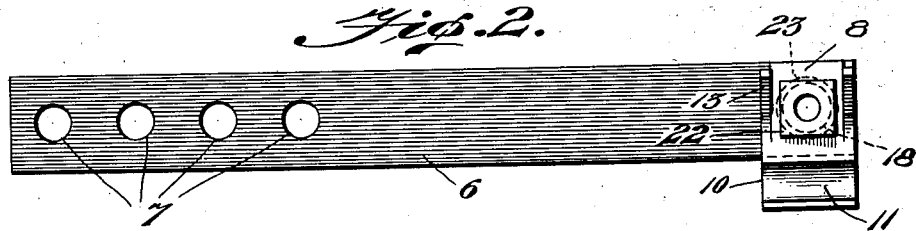
Figure 3:
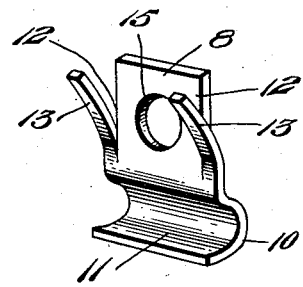

Figure 1 is an enlarged perspective view of my clamp engaging a pipe,

Figure 2, a plan view of the unbent clamp,

Figure 3, a detail view of the attaching plate, and

Figure 4:
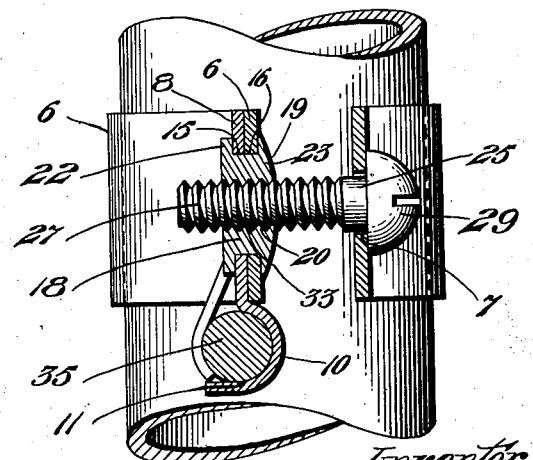

Figure 4, a section taken on line 4—4 of Figure 1.

Like reference characters indicate like parts throughout the views.

In the form of my invention herein illustrated 6 is a flat oblong strip of copper or other bendable or pliable electrically conductive metal, provided with a longitudinal series of holes 7 extending from one end adapted to receive a screw or bolt. Fast to the outer or upper side of the strip, at the end opposite to that containing the holes is a metallic connecting plate 8 disposed transversely to the strip and having integral with its end a lip 10 projecting laterally from the strip and provided with a channel 11 parallel to the strip. The plate 8 is longitudinally slit in each lateral margin, as at 12, forming flexible fingers 13. In the center of the plate is an opening 15 adapted to register with an opening 16 in the strip 6 in line with the holes 7. Fast in the openings is the tubular body 18 of an attaching member, indicated generally by 19, provided with an internal thread 20 and having upon its ends bearing disks 22 and 23 engaging respectively the plate 8 and strip 6. As a tight surface engagement of the plate 8 with the strip 6 is essential to prevent arcing between these members it is desirable that the disks 22 and 23 not only be of ample dimensions, but also that they tightly engage and bind the metallic elements embraced thereby. One convenient means of attaining this result is by spinning the disk 23 which results, in this instance, in imparting to its circular or annular face a slight convexity. The disk 22 is, in the form thereof herein shown, of rectangular outline with opposite sides adjacent the arms 13. A clamping screw, indicated generally by 25, comprises a threaded shank 27 engageable with the thread 20 and adapted to pass through a hole 7, and a screw head 29 adapted to engage the outer face of the strip 6.

As illustrated the strip 6 is manually bendable around a vertically disposed pipe 31, and the screw 27 is then passed through one of the holes 7 and engaged in the threaded bore 33 of the member 19 whereby the strip is clamped to the pipe. The exposed end of the electric wire or conductor 35 is placed in the channeled lip or seat 10, and the fingers 13 are thereupon bent down over the wire, as shown in Figures 1 and 3. With the wire thus held in engagement with its seat the operator has the freedom of both hands to apply the solder to attach the wire to its seat.

Having thus described one illustrative embodiment of my invention, it is understood that the specific terms employed are used in a descriptive sense only, and are not for the purpose of limitation, the scope of the invention being defined by the appended claims.

I claim:—

1. In a ground clamp, a strip adapted to be bent between its ends around a pipe and provided near one end with a hole, and near its other end with an opening, a connecting plate attached to the side of the strip provided with an opening, a lip upon the plate projecting from the strip adapted to receive a conductor, an attaching member comprising a tubular body in the openings provided with an internal thread and disks integral with the ends of the body engaging the exposed faces of the strip and plate, and a screw engaging the thread in the body adapted to project through the hole.

2. In a ground clamp, a strip adapted to be bent between its ends around a pipe and provided near one end with a hole, and near its other end with an opening, a plate attached to the strip provided with an opening registering with the first opening, a lip integral with the end of the plate provided with a channel adapted to receive a conductor, and fingers supported by the plate disposed transversely to the channel.

In testimony whereof I have affixed my signature.

CHARLES V. PERRY.